C. GROVER.
DISTRIBUTION OF ELECTRICAL ENERGY.
APPLICATION FILED OCT. 24, 1919.
1,337,129.
Patented Apr. 13, 1920.
2 SHEETS—SHEET 1.
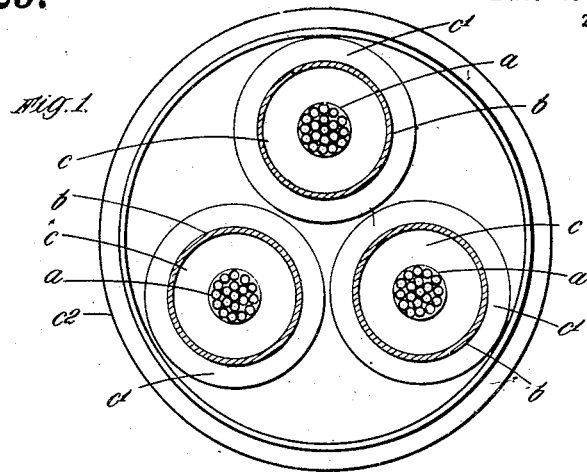
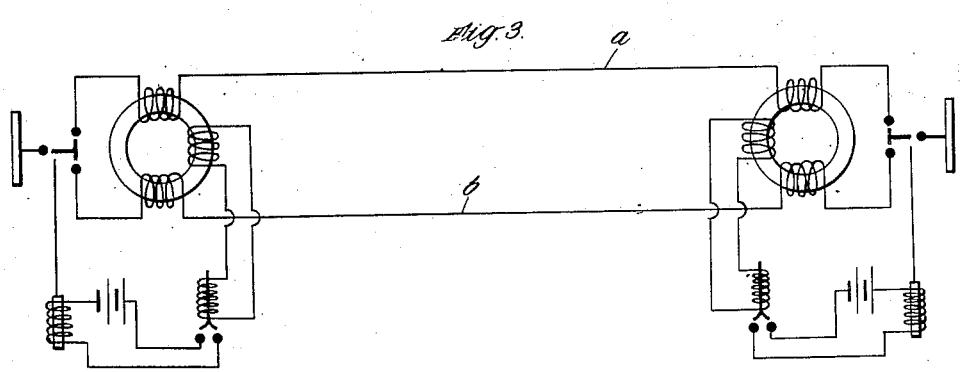
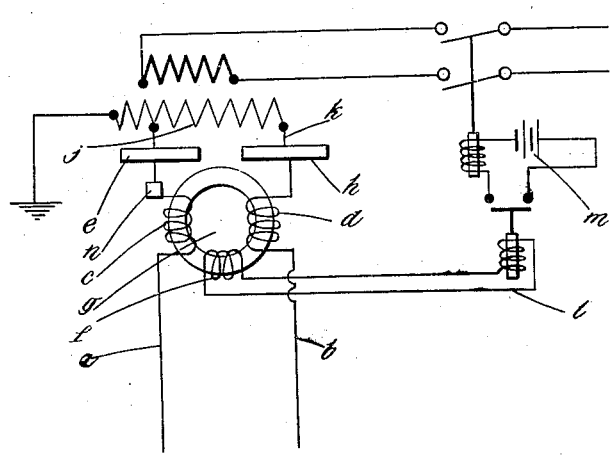

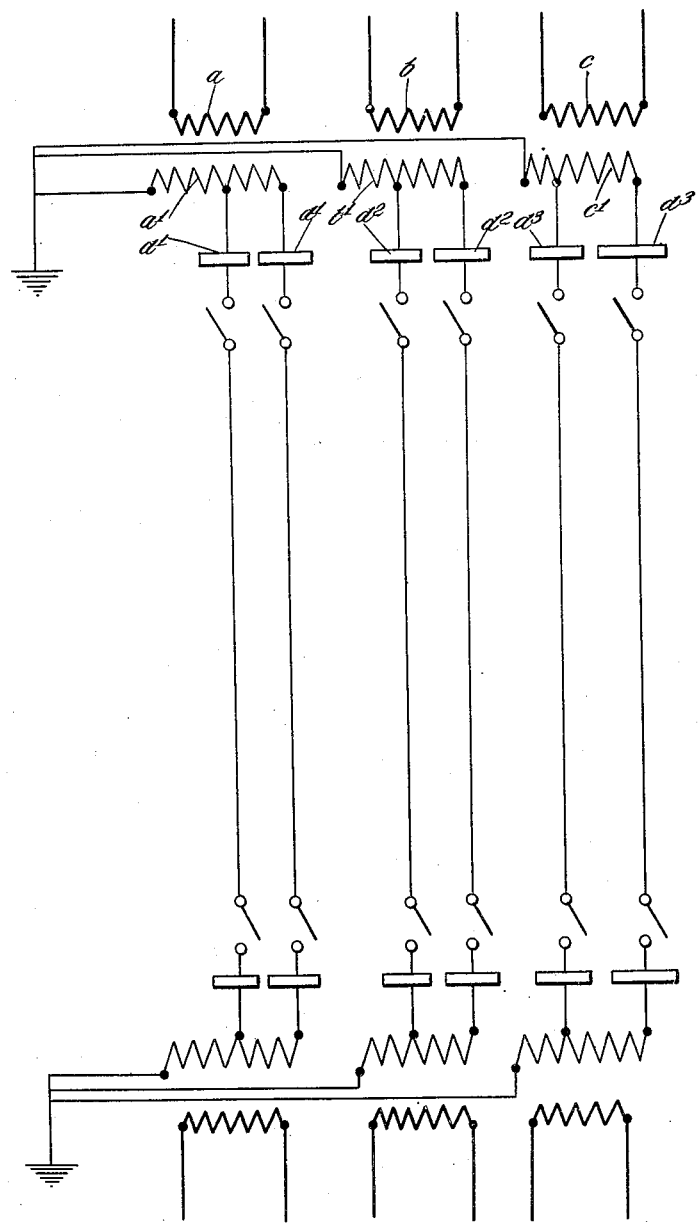

UNITED STATES PATENT OFFICE.

CHARLES GROVER, OF GRAVESEND, ENGLAND, ASSIGNOR TO W. T. HENLEY'S TELEGRAPH WORKS COMPANY LIMITED, OF LONDON, ENGLAND.

DISTRIBUTION OF ELECTRICAL ENERGY.

1,337,129. Specification of Letters Patent. Patented Apr. 13, 1920.

Application filed October 24, 1919. Serial No. 333,086.

*To all whom it may concern:*

Be it known that I, CHARLES GROVER, of 48 Kent road, Gravesend, in the county of Kent, England, electrical engineer, have invented certain new and useful Improvements in the Distribution of Electrical Energy, of which the following is a specification.

In an electric cable it is well known that the stresses in the dielectric surrounding the conductor or conductors are not uniform, being greater at or near to the surface of the said conductors, and that to effect a more equal distribution of these stresses what are known as "intersheaths" or "grading sheaths" have been suggested and used in connection with cables designed to operate at very high voltages.

Various methods have been suggested for constructing these intersheaths and to feed in the necessary charging currents for alternate current working to the best advantage, but they possess the disadvantage of introducing material into the cable and additional external apparatus which tends to counteract the saving in the cost of the cable effected by the reduced thickness of dielectric.

In an electric power distribution system according to the present invention, each main conductor is divided into a plurality of subsidiary conductors whereof the innermost subsidiary conductor of each main conductor is run at the full voltage of the system, while the remaining subsidiary conductor (or conductors) is (or are) arranged concentrically or externally relatively to the innermost conductor, and is (or are) operated at relatively lower voltages which decrease in the order of the distance of the respective conductors from the innermost conductor. The number of subsidiary conductors may be increased as desired, but it will generally be found that two are sufficient.

My improved distribution system may also comprise protective devices for automatically isolating or disconnecting from the system any section thereof whenever an electrical fault or leakage takes place therein.

In the accompanying drawings, I have shown how my said invention may be conveniently and advantageously carried into practice.

Figure 1 is a transverse section of a cable constructed according to my invention.

Fig. 2 is a diagram illustrating the application of my invention to an electrical power distribution system operating without any protective device.

Fig. 3 is a diagram showing the principle of the known split conductor system.

Fig. 4 is a diagram illustrating the application of my invention to an electrical power distribution system provided with an automatic protective device.

Referring to Fig. 1, $a$ is the innermost subsidiary conductor and $b$ another subsidiary conductor concentrically arranged. $a$ is run at the full voltage of the system while $b$ is run at a relatively lower voltage than $a$. The voltage at which $b$ is run is selected so as to obtain the most economical distribution of stresses in the dielectric necessary for the voltage of the system of distribution, while the load transmitted is divided among the subsidiary conductors according to the maximum voltage and the electrical power to be transmitted. $c$ and $c^1$ are the layers of dielectric separating and insulating the subsidiary conductors. $c^2$ is a lead-sheathed insulating layer inclosing the three elements.

The conductors of any type of cable may be divided into a plurality of subsidiary conductors, for example a cable could be a single concentric cable arranged as one of the elements of the multicore cable shown in Fig. 1, comprising $a$ $b$ $c$ and $c^1$ suitably protected by lead sheath or other means, or it could be a multicore concentric cable with two or more conductors arranged as shown in Fig. 1. Moreover, the conductors need not necessarily be circular; the innermost conductor may be of any of the shapes generally known as "clover leaf," "oval," "quadrant," or D shaped, and in such cases the outer subsidiary conductors would be arranged relatively to the said inner conductors with a substantially uniform thickness of dielectric separating them.

This principle of transmitting power by two or more voltages in the one cable may be applied to any known system of distribution and is particularly applicable to systems operating on what is known as the "split conductor" principle, that is, systems wherein each conductor is divided into two conductors both run in parallel and at the same electrical potential and each offering substantially equal impedance to the passage of current therethrough, and each provided with means for automatically isolating or disconnecting from the system any section thereof whenever an electrical fault or leakage takes place. The application of this invention to an electrical power distribution system operating without any special protective device is shown in Fig. 2.

As an example, an ordinary three-phase system is shown which may be either "mesh" or "star" connected. $a$, $b$, $c$ represent the primary windings of the transformer or transformers at the transmitting end of the cable. The respective secondary windings $a^1$, $b^1$, $c^1$ are tapped at a point such that the voltages across the full windings of the phase and the tapped part thereof will be those which are required to effect the purpose herein described. The bus-bars $d^1$, $d^2$, $d^3$ may be provided to facilitate the distribution of the power at the different voltages. If desired, the number of tappings from the transformers may be increased to provide current at a greater number of different voltages for the purpose hereinbefore described. The arrangement of transformers and bus-bars at the receiving end of the cable is similar to that at the transmitting end.

The application of this invention to a system provided with automatic protective devices is shown in Fig. 4 in which the system selected is that known as the split conductor system.

The system generally adopted for split conductor working is three-phase; one phase is shown for example, the others being similar. $a$ and $b$ in Fig. 3 are the split conductors of a phase of a split conductor cable, both conductors being designed with equal impedances. The impedance is equalized in a jointed feeder by connecting the inner conductor of one section to the outer conductor of the adjoining section or sections, and vice versa. In applying the present invention to this system it is not possible to so join sections of cable with inner conductors of one section to outer conductors of other sections and vice versa, but if a cable be so designed that the radius of the inside of the outermost subsidiary conductor is twice that of the innermost subsidiary conductor, the main conductor having been divided into two subsidiary conductors as hereinbefore described, then their resultant charging currents with alternating currents will be approximately the same if the respective voltages are proportional to the natural potential gradients. Also the resistance and capacity of the subsidiary conductors and apparatus connected thereto may be arranged so that the charging currents thereof will be similar and substantially in phase.

Now in the ordinary split conductor system the inner and outer conductors of any phase of a cable are connected at one or either end to current transformers, the windings of which are electrically opposed. The other ends of the windings are connected to bus-bars or other apparatus at substantially the same electrical potential. A third winding is introduced into the current transformer which is connected to a relay or device which operates apparatus for cutting the current completely off the cable. Whenever a fault occurs on the cable the currents in the opposed windings of the current transformers which are normally equal have their equilibrium disturbed, wherein current is generated in the winding connected to the relay or other apparatus which in turn operates the apparatus that cuts the current off the cable.

In applying the present invention to this system, the two aforementioned subsidiary conductors $a$ and $b$ in Fig. 4 are connected each to one of the opposed windings $c$ and $d$ of a similar current transformer $g$, the windings having to be insulated sufficiently from one another to withstand the difference of electrical potential between the two subsidiary conductors. The other ends of these windings are connected to bus-bars or other apparatus maintained at the respective voltages at which it has been decided to transmit electrical power through the said subsidiary conductors such as to bus-bars $e$ and $h$ maintained at the said voltages respectively by means of a tapping $j$ from the secondary winding of a transformer and the full voltage of the transformer winding $k$. The respective voltages may, however, be given by independent transformers.

A third winding $f$ is introduced into the current transformer which is connected to a relay or other device which operates apparatus for cutting the current completely off the cable. Such apparatus is shown at $m$, for example, consisting of a local battery magnetically operating a main switch when the local circuit is closed by the relay $l$.

The voltages at which the subsidiary conductors are run may be such that the ratio of the voltage of the inner subsidiary conductor to the voltage of the outer subsidiary conductor is equal to twice the ratio of the capacity of the inner subsidiary conductor and apparatus connected thereto to the capacity of the outer subsidiary conductor and the apparatus connected thereto.

Choking coils, resistances or capacities $n$ may be introduced to assist in equalizing the currents in the subsidiary conductors under normal circumstances, and to render the apparatus responsive to fault conditions, and as the "time constants" of the subsidiary conductors may, by suitably apportioning the resistances, capacities and inductances of the subsidiary conductors and apparatus connected thereto, be so designed as to be approximately equal, the total currents they respectively carry would be substantially in phase. Time lag devices can be introduced to overcome the effects of unequal surges which may occur in the subsidiary conductors when a cable is switched on.

I claim:—

1. In a system for the transmission of electrical energy, a cable, a plurality of conductors through which electrical power is transmitted and which are arranged concentrically, the innermost of which conductors operates at the highest voltage and the outer conductor or conductors at relatively lower voltages, these voltages decreasing in the order of the distance of the respective conductors from the innermost, substantially as and for the purpose described.

2. In a system for the transmission of electrical energy, a cable, a plurality of conductors through which electrical power is transmitted and which are arranged concentrically, the innermost of which conductors operates at the highest voltage and the outer conductor or conductors at relatively lower voltages, and adjustable resistances, capacities and inductances associated with said conductors whereby the charging currents in the conductors may be equalized and synchronized, substantially as described.

3. In a system for transmission of polyphase electrical energy, a set of compound conductors the axes of the individual compound conductors being arranged symmetrically about the axis of the set and the number of compound conductors of the set corresponding to the number of phases of the said polyphase electrical energy, each compound conductor comprising a plurality of concentric conductors and being connected with a source of electricity in such a way as to cause the inner conductors to operate at a higher voltage than the outer ones.

4. In a system for the transmission of electrical energy, a cable comprising a plurality of conductors one of which is surrounded by another and operates at a higher voltage than such other conductor.

CHARLES GROVER.